Jan. 17, 1961     T. G. HARKEY     2,968,385
EGG COLLECTING APPARATUS
Filed Dec. 30, 1958     2 Sheets-Sheet 1
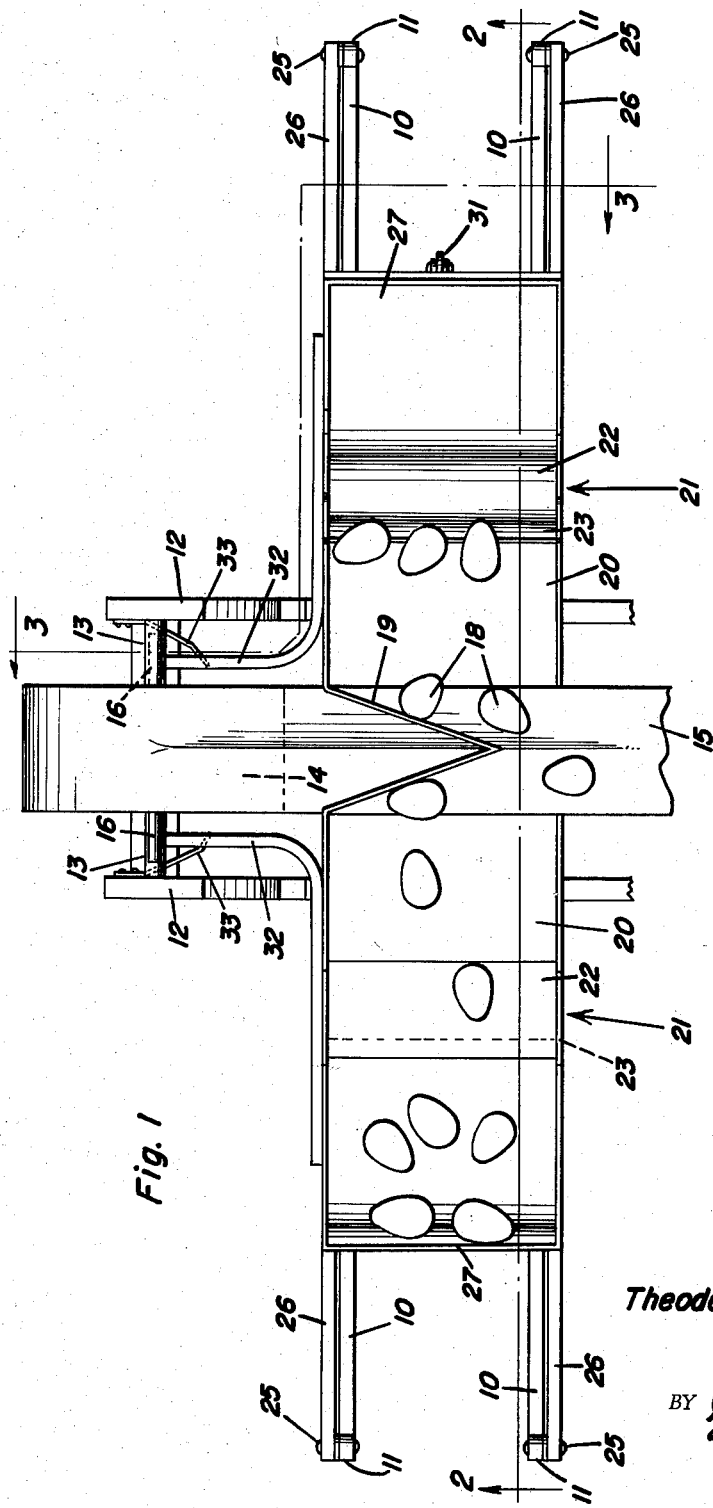
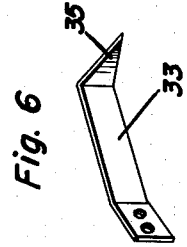
Theodore Griffith Harkey
INVENTOR.

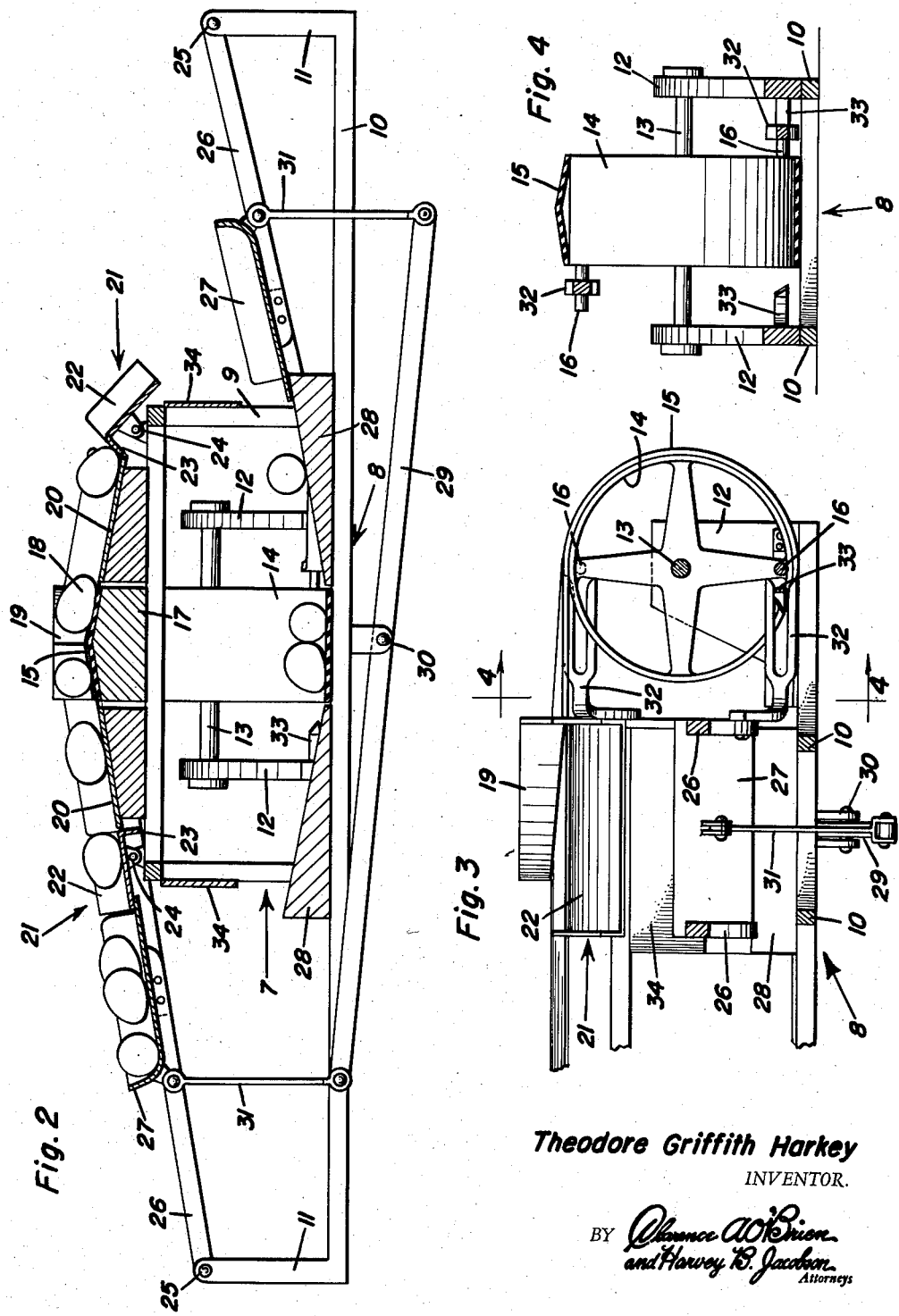

# United States Patent Office 2,968,385
Patented Jan. 17, 1961

2,968,385

EGG COLLECTING APPARATUS

Theodore Griffith Harkey, Rte. 3, Paris, Ark.

Filed Dec. 30, 1958, Ser. No. 783,795

9 Claims. (Cl. 198—26)

This invention relates to an improved egg collecting apparatus of the endless belt conveyor type and has for its primary object to provide, in a manner as hereinafter set forth, an apparatus of this character wherein both runs of the belt are utilized for receiving the eggs from a double deck battery of laying nests and delivering said eggs to a point of discharge or removal.

Another very important object of the present invention is to provide an egg collecting or gathering apparatus of the aforementioned character comprising novel means for automatically transferring the eggs from the upper-run of the conveyor belt to the lower run thereof without danger of breakage.

Other objects of the invention are to provide an egg collecting or gathering apparatus of the character described which will be comparatively simple in construction, strong, durable, compact, of light weight and which may be manufactured and installed at low cost.

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

Figure 1 is a top plan view of an egg collecting apparatus constructed in accordance with the present invention;

Figure 2 is a view in transverse section through the apparatus, taken substantially on the line 2—2 of Figure 1;

Figure 3 is a longitudinal sectional view, taken substantially on the line 3—3 of Figure 1;

Figure 4 is a view in transverse section, taken substantially on the line 4—4 of Figure 3;

Figure 5 is a perspective view of one of the egg lowering scoops, pans or buckets; and Figure 6 is a detail view in perspective of one of the resilient latches which temporarily secure the lowering mechanism against movement.

Referring now to the drawing in detail, it will be seen that the embodiment of the invention which has been illustrated comprises a supporting structure of suitable material which is designated generally by the reference character 7. The supporting structure 7 includes a base portion 8 having mounted thereon a stand 9. The base 8 comprises a pair of spaced, transversely extending, parallel bars 10 which terminate in upturned end posts 11.

Mounted on the base 8 is a pair of upstanding brackets or bearings 12 having journaled thereon a transverse shaft 13. Mounted on the shaft 13 is a pulley 14 over which a conveyor belt 15 is trained. Mounted on the opposite sides of the pulley 14 at diametrically opposite points are pins 16 the purpose of which will be presently set forth.

Mounted longitudinally beneath the belt 15 on the stand 9 is an anticlinal bar or block 17 over which said belt travels. As shown to advantage in Figure 2 of the drawing, the block 17 raises or humps the central portion of the belt 15 whereby the eggs, as indicated at 18, on the upper run of said belt will roll laterally by gravity therefrom in opposite directions. This phase of the operation is further ensured by a substantially V-shaped divider or guide 19 which is mounted on the stand 9 over the upper run of the belt. Also mounted on the stand 9, closely adjacent the sides of the belt 15 for receiving the eggs 18 by gravity therefrom, is a pair of outwardly and downwardly inclined chutes 20. Rockably mounted for vertical swinging movement on the stand 9 adjacent the lower ends of the chutes 20 for controlling the discharge of the eggs therefrom is a pair of stops 21. The stops 21 include troughs 22 which are provided on their inner ends with depending flanges 23 which, when in operative position as shown in Figure 2 of the drawing, are adapted to obstruct the chutes 20. The troughs 22 are pivotally mounted on the stand 9, as indicated at 24. The pivotally mounted troughs 22 are overbalanced and normally swing downwardly by gravity to operative position for retaining the eggs in the chutes 20.

Pivotally secured at 25 on the upper end portions of the posts 11 are pairs of vertically swinging arms 26. The arms 26 extend inwardly from the posts 11 and have mounted on their inner or free end portions scoops or buckets 27 which are engageable beneath the troughs 22 for actuating the stops 21 to egg-releasing position and for receiving the eggs from the chutes 20. Mounted on the base 8 closely adjacent the sides of the lower run of the belt 15 for delivering the eggs thereto from the buckets 27 is a pair of inwardly and downwardly inclined chutes 28. A vertically swinging lever or rocker arm 29 is pivotally secured as at 30 beneath the base 8. The buckets 27 are connected to the rocker arm 29 for operation in unison by links 31.

The buckets 27 are connected to the pulley 14 for intermittent actuation thereby by means comprising angulated forks 32 on one of each of the pairs of arms 26. The pins 16 are engageable in the forks 42 for operatively connecting the pulley 14 to the arms 26. Resilient latches 33 on the brackets 12 are adapted to snap into the forks 32 for temporarily securing the buckets 27 in raised and lowered positions while loading and unloading. Vertical baffles 34 on the sides of the stand 9 prevent the eggs from rolling out of the buckets 27 while said buckets are swinging downwardly.

It is thought that the operation of the apparatus will be readily apparent from a consideration of the foregoing. Briefly, the eggs from the upper and lower runs of nests are delivered in any suitable manner to the upper and lower runs, respectively of the belt 15. The eggs thus deposited on the lower run are conveyed directly to the point of discharge or removal. The eggs on the upper run, travelling in the opposite direction arrive at the divider or guide 19 and roll by gravity off both sides of the belt into the chutes 20. As shown to advantage in Figure 2 of the drawing, with one of the buckets 27 is lowered position, the respective stop 21 is in operative position for causing the eggs on one side of the belt to accumulate in the respective chute 20. With the other bucket 27 in raised or elevated position the respective stop 21 is held thereby in raised or egg-releasing position and the eggs roll by gravity from the respective chute 20 through the respective trough 22 to said other bucket 27. Of course, the apparatus may be powered from any suitable source. The belt pulley 14 rotates clockwise and the pins 16 enter the respective forks 32 which are in lowered position for swinging the arms 26 upwardly thus elevating the buckets 27. Thus, the buckets 27 are actuated intermittently in an obvious manner. As the forks 32 approach lowered position, said forks engage and ride on the pointed or substantially triangular, angularly bent free end portions 35 of the resilient latches 33, thus bending said latches outwardly and tensioning same. Then when the forks 32 reach lowered position the latches 33 snap thereinto for securing the buckets in the loading and unloading positions. The pins 16, entering the forks 32, disengage the latches 33 therefrom. As the buckets 27 swing downwardly from beneath the stops 21, said stops rock by gravity to operative or egg-retaining position. As the loaded buckets 27 approach the limit of their downward movement and clear the baffles 34, the eggs roll from said buckets down the chutes 28 to the lower run of the belt 15. As hereinbefore indicated, the rocker arm 29 and the links 31 ensure operation of the buckets 27 in unison. When empty, the buckets 27 again swing upwardly and rock the stops 21 to egg-releasing position.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. An egg collecting apparatus comprising: a conveyor including an endless belt having upper and lower runs, chutes on opposite sides of the upper run for receiving eggs therefrom, vertically swingable buckets on opposite sides of the conveyor for receiving the eggs by gravity from the chutes, stops operable by the buckets for controlling the discharge of the eggs from the chutes, means for receiving the eggs by gravity from the buckets and depositing said eggs on the lower run of the belt, means connecting the buckets to the conveyor for actuation thereby, and means connecting the buckets to each other for operation in unison.

2. An egg collecting apparatus comprising: a conveyor including an endless belt having upper and lower runs, vertically swingable buckets on opposite sides of the conveyor for transferring eggs from the opposite sides of the upper run thereof to the opposite sides of the lower run, means operable by the buckets for controlling the discharge of the eggs from the upper run of the conveyor into said buckets, and means for conveying the eggs from the buckets to the lower run of the conveyor by gravity, and means for connecting said buckets for inverse and simultaneous movement relative to each other.

3. An egg collecting apparatus comprising: a conveyor including a pulley and an endless belt trained around said pulley and having upper and lower runs, buckets mounted for vertical swinging movement on opposite sides of the conveyor for receiving eggs from the upper run and transferring said eggs to the lower run, and means operatively connecting the pulley to the buckets for intermittently actuating said buckets, said means including forks mounted on the buckets, and pins on the pulley at diametrically opposite points and engageable in the forks for intermittently actuating the buckets.

4. An egg collecting apparatus of the character described comprising: a supporting structure, a conveyor mounted on said supporting structure and including a pulley, said conveyor further comprising an endless belt trained over the pulley and having upper and lower runs, chutes on the supporting structure on opposite sides of the conveyor for receiving eggs by gravity from the upper run, stops mounted on the supporting structure for controlling the discharge of the eggs from the chutes, arms mounted for vertical swinging movement on the supporting structure, buckets mounted on the free end portions of said arms for receiving the eggs by gravity from the chutes, said buckets being engageable with the stops to egg-releasing position, chutes on the supporting structure for conveying the eggs by gravity from the buckets to the lower run, means operatively connecting the buckets for operation in unison, and means operatively connecting the pulley to the arms for raising and lowering the buckets.

5. An egg collecting apparatus of the character described comprising: a supporting structure, a conveyor mounted on said supporting structure and including a pulley, said conveyor further comprising an endless belt trained over the pulley and having upper and lower runs, chutes on the supporting structure on opposite sides of the conveyor for receiving eggs by gravity from the upper run, stops mounted on the supporting structure for controlling the discharge of the eggs from the chutes, arms mounted for vertical swinging movement on the supporting structure, buckets mounted on the free end portions of said arms for receiving the eggs by gravity from the chutes, said buckets being engageable with the stops for actuating said stops to egg-releasing position, chutes on the supporting structure for conveying the eggs by gravity from the buckets to the lower run, means operatively connecting the buckets for operation in unison, and means operatively connecting the pulley to the arms for raising and lowering the buckets, the last named means including forks mounted on the arms, resilient latches on the supporting structure engageable in said forks for releasably securing the buckets in raised and lowered position, and pins on the pulley engageable in the forks for disengaging the latches therefrom and for intermittently actuating the arms.

6. The combination of claim 1 wherein said buckets are connected to each other for inverse movement relative to each other.

7. An egg collecting apparatus comprising a conveyor including an endless belt having upper and lower runs, vertically swingable buckets disposed on opposite sides of said belt for receiving eggs from the opposite sides of the upper run thereof and transferring eggs from the upper run to the lower run, means connecting the buckets to the conveyor for actuation thereby, and means connecting the buckets to each other for operation inversely relative to each other and in unison.

8. An egg collecting apparatus comprising a conveyor including an endless belt having upper and lower runs, vertically swingable buckets disposed upon opposite sides of said belt for receiving eggs from the opposite sides of the upper run of said belt and transferring the eggs to the opposite sides of the lower run thereof, means connecting said buckets to each other for inverse and simultaneous movement relative to each other, each of said buckets being downwardly and outwardly inclined to receive eggs from the upper run of said belt by gravity, said connecting means including means for tilting each of said buckets to a position downwardly and inwardly inclined upon its movement vertically towards said lower run from adjacent said upper run for discharging eggs therefrom onto said lower run.

9. The combination of claim 8 including means for retaining eggs in each of said buckets until the latter have reached substantially their lowermost positions adjacent said lower run.

References Cited in the file of this patent

UNITED STATES PATENTS

| | | |
|---|---|---|
| 239,164 | Hinds | Mar. 22, 1881 |
| 1,093,815 | Whittier | Apr. 21, 1914 |
| 1,837,607 | Biggart | Dec. 22, 1931 |
| 2,771,980 | Parducci et al. | Nov. 27, 1956 |
| 2,835,372 | Biddison | May 20, 1958 |